United States Patent [19]

Eichelberger et al.

[11] 4,298,789

[45] Nov. 3, 1981

[54] OVEN HAVING A CAVITY HEATED BY AT LEAST ONE MONOLITHIC INTEGRATED HEAT SOURCE

[75] Inventors: Charles W. Eichelberger; Charles E. Thomas, both of Schenectady; Robert J. Wojnarowski, Clifton Park, all of N.Y.

[73] Assignee: General Electric Company, Schenectady, N.Y.

[21] Appl. No.: 132,812

[22] Filed: Mar. 24, 1980

[51] Int. Cl.³ .......................... F27D 11/02; A21B 1/00

[52] U.S. Cl. .................................... 219/406; 219/391; 219/543; 219/552; 219/521; 252/502; 338/309; 338/328

[58] Field of Search ............... 219/216, 203, 521, 522, 219/543, 552, 385, 406, 407, 390, 391, 395, 301, 210, 424, 468; 338/308, 309, 328, 327, 101; 13/25; 427/96, 123, 101; 428/328, 428, 427, 432; 252/509, 518; 136/161; 204/38 A

[56] References Cited

U.S. PATENT DOCUMENTS

| | | | |
|---|---|---|---|
| 2,624,823 | 1/1953 | Lytle | 219/543 X |
| 2,678,990 | 5/1954 | Quirk | 219/406 |
| 2,855,495 | 10/1958 | Grant | 219/406 |
| 3,118,042 | 1/1964 | Parlico | 219/406 |
| 3,412,234 | 11/1968 | Otavka | 219/406 |
| 3,649,366 | 3/1972 | Jordan et al. | 219/543 X |
| 3,679,473 | 7/1972 | Blatchford et al. | 427/96 |
| 3,694,627 | 9/1972 | Blatchford et al. | 219/543 |
| 3,763,004 | 10/1973 | Wainer et al. | 219/543 X |
| 3,816,702 | 6/1974 | Green | 219/408 X |
| 4,091,144 | 5/1978 | Dresner et al. | 428/328 |
| 4,169,344 | 9/1979 | Shapiro et al. | 428/427 |
| 4,204,107 | 5/1980 | Ohkubo et al. | 219/543 X |

*Primary Examiner*—Volodymyr Y. Mayewsky
*Attorney, Agent, or Firm*—Geoffrey H. Krauss; James C. Davis; Marvin Snyder

[57] ABSTRACT

A cavity, such as an oven cavity, is heated by at least one monolithic integrated heat source, each fabricated by depositing a layer of resistive material on a substrate of non-conducting, or insulating, material. A pair of spaced-apart conductive elements contact opposite ends of the resistance sheet to enable a flow of current through the sheet thereby producing substantially uniform heating over the entire area covered by the resistive sheet.

24 Claims, 6 Drawing Figures

40

Fig. 1a
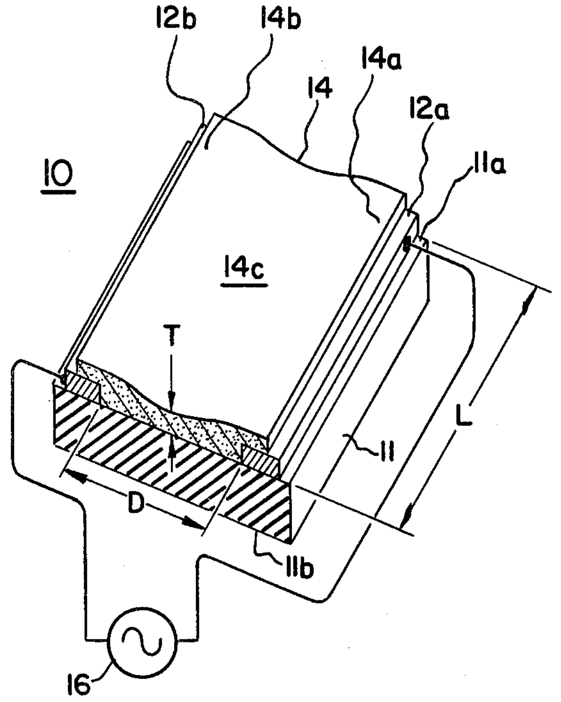
Fig. 1b
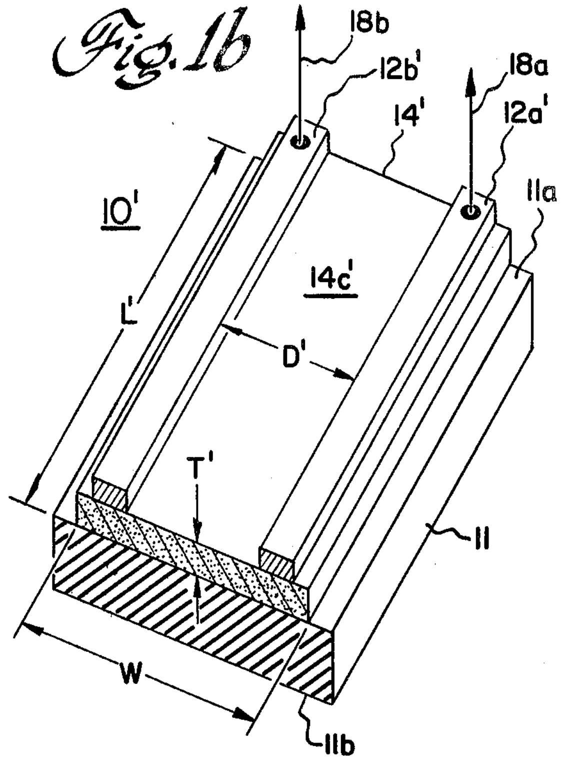
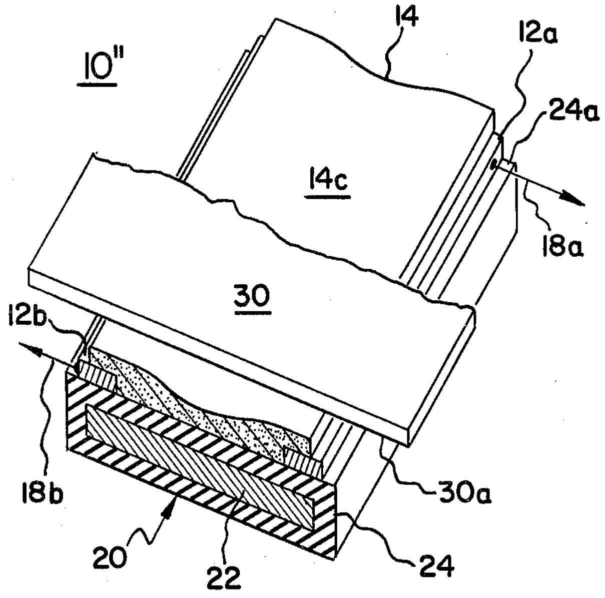
Fig. 1c
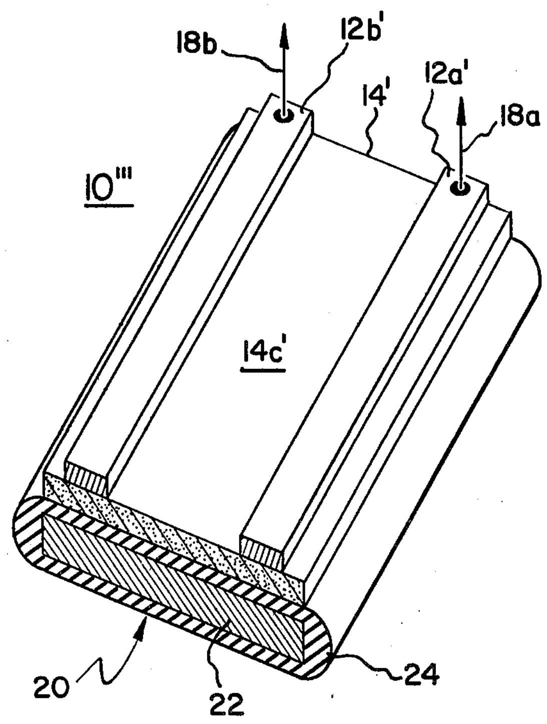
Fig. 1d

40
Fig. 2
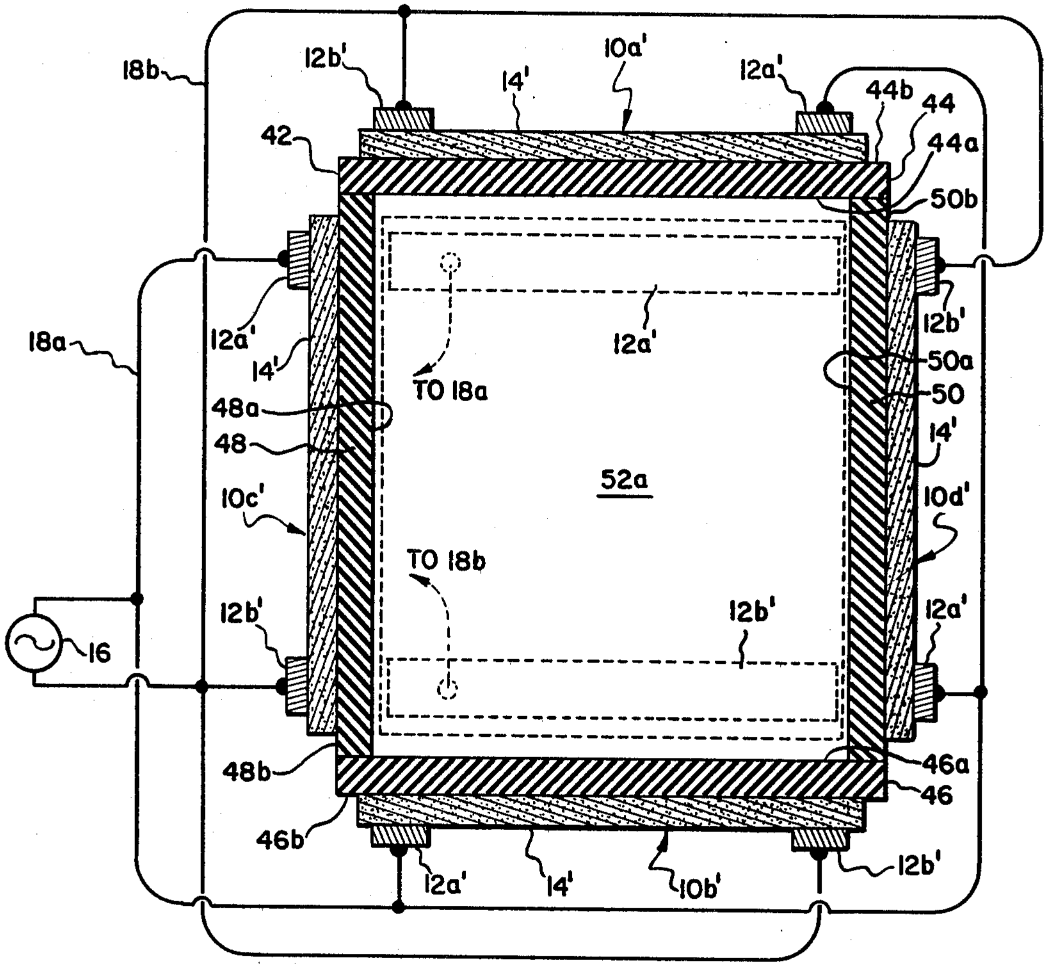
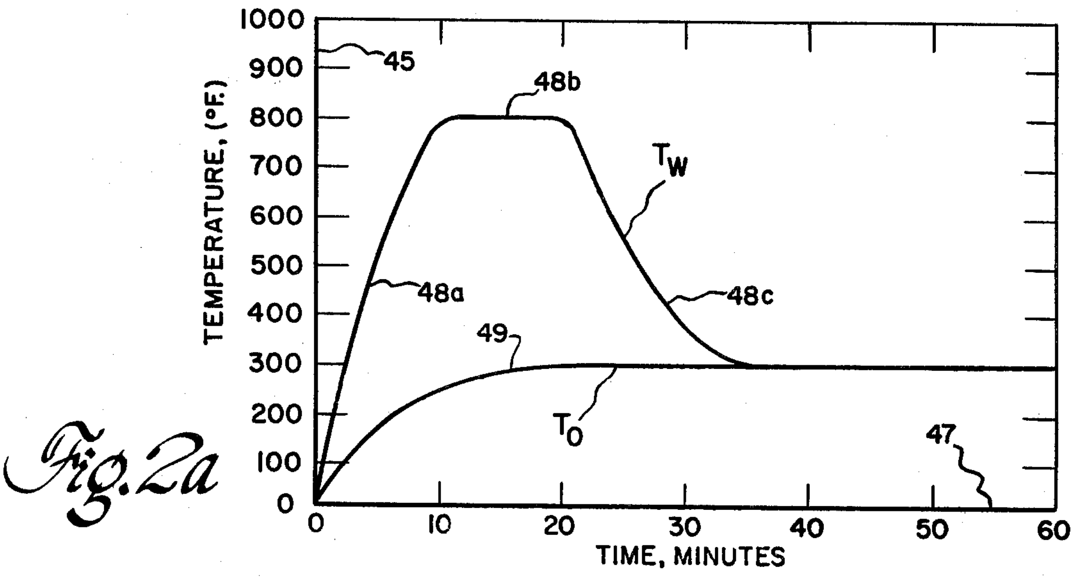
Fig. 2a

OVEN HAVING A CAVITY HEATED BY AT LEAST ONE MONOLITHIC INTEGRATED HEAT SOURCE

BACKGROUND OF THE INVENTION

The present application relates to sources of heat energy and, more particularly, to a novel monolithic integrated heat source.

It is well known that a wide variety of appliances require the conversion of electrical energy into heat energy. Among these appliances are: clothes irons, food-warming trays, toasters, electric frying pans, crepe makers, waffle irons, toasted sandwich makers, mullion heaters in no-frost refrigerators, frost eliminators in air conditioners, clothes dryers, vaporizers, dishwasher and oven heating elements, crock pot heaters, hot shaving lather makers, local room heaters, roof-eave and sidewalk de-icers, and many other appliances, of which the foregoing is by no means an exhaustive list. Many problems are, however, encountered with the use of conventional apparatus for conversion of electrical energy to heat energy.

As an example, the conventional appliance oven is a structure generally consisting of an insulated metal box having at least one heating element within the central cavity thereof. Thus, space must be provided, within the oven cavity, in which to position the heating element, thereby effectively reducing the total available space in which food to be cooked can be placed within the oven cavity. In the small toaster-type ovens, the heating elements, which may be CALROD®s and the like heating elements, may occupy as much as 25% of the usable volume in the oven cavity. Further, since the heating element is a lineal source, uneven heating of the cavity, and of the food being cooked therein, occurs; this phenomena is commonly called "hot spots." Additionally, the heating element can be contacted by user personnel; as the heating element ordinarily is powered by eventual connection to commercial power means, potentially lethal voltages may be contacted by the user personnel, whereby the danger of electrical shock is always present.

In home ovens of the self-cleaning type, additional problems occur, due to the inability to raise the temperature of the oven walls evenly. Certain oven wall areas, such as near the oven front door, will be colder than the remaining wall areas, whereby additional heating elements, such as mullion-type heaters, will be required. This adds additional cost of materials and labor, as well as necessitating additional power consumption. If the material to be self-cleaned from the oven falls into the class of "sugars," initial application of heat during the self-cleaning process causes an ash to form on, or over, the surface of the material to be cleaned and effectively insulates the bulk of that substance from the convection-transported, externally-applied heat energy utilized in the self-cleaning process. Therefore, additional time and energy is required to clean materials of this class from the oven walls. Because of the relatively high-cleaning temperatures required, on the order of 800° F., the oven must be equipped with oven door glass heat shields, safety door latches and redundant temperature controls, in addition to a greater amount of heat insulation than would normally be required by a conventional oven, in order to keep the temperature of the air surrounding the oven from becoming dangerously high and presenting a fire and/or personnel hazard.

Heat-energy sources, for use in ovens and the like appliances, having a reduced degree of safety hazard, as well as being less costly and energy consumptive, are therefore highly desirable.

BRIEF SUMMARY OF THE INVENTION

In accordance with the invention, a monolithic integrated heat source includes an insulative substrate upon a surface of which is fabricated a sheet of a resistive material. The resistive material sheet has a pair of spaced-apart opposed edges, at each of which is located a relatively conductive member. Electrical energy is applied between the conductive members, whereby a current is caused to flow substantially through the entire sheet of resistance material, and is essentially converted into heat energy, having a substantially uniform distribution over the surface of the entire resistive sheet element of the heat source.

In presently preferred embodiments of the present invention, the conductive elements may be initially fabricated upon the insulated substrate, with the resistive material sheet being applied over the conductive element and insulative substrate surfaces, or the resistive sheet may be applied directly to the insulative substrate surface, with the conductive elements being applied to the surface or edges of the resistive sheet thereafter. The substrate may be an insulative covering formed about a normally conductive core. Advantageously, the insulative material is not only highly electrically insulative, but also highly heat conductive, whereby the substrate surface, opposite to that surface upon which the resistive sheet has been fabricated, will be a substantially uniformly heated interior surface, as of an oven cavity, while the resistive sheet and electrical-current-carrying conductors will be insulated from the interior of the cavity. Further, by causing the substrate to be heated to a relatively high temperature, self-cleaning of the heated cavity walls may be accomplished while the interior of the cavity is heating to a relatively lower and safer temperature, thus reducing personnel safety hazards.

Accordingly, it is an objection of the present invention to provide a monolithic integrated heat source.

This and other objects of the present invention will become apparent from consideration of the following detailed description, when read in conjunction with the drawings.

BRIEF DESCRIPTION OF THE DRAWINGS

FIGS. 1*a*–1*d* are prospective views of several presently preferred embodiments of monolithic integrated heat sources, in accordance with the principles of the present invention;

FIG. 2 is a sectional view of an oven cavity constructed of monolithic integrated heat source elements in accordance with the principles of the present invention; and FIG. 2*a* is a graph illustrating the wall and oven cavity temperatures, with respect to time, in an oven cavity of the type illustrated in FIG. 2.

DETAILED DESCRIPTION OF THE INVENTION

Referring initially to FIG. 1*a* a monolithic integrated heat source 10 is fabricated upon an electrically insulative substrate 11, which may be ceramic and the like material. A pair of conductive members 12a and 12b are attached in spaced-apart, but not necessarily parallel, configuration upon a first surface 11a of the substrate. A sheet of resistive material 14 is then fabricated upon at least that portion of substrate surface 11a between electrodes 12a and 12b, and with the resistive material sheet 14 in electrical contact with each of electrodes 12a and 12b along the length thereof; portions 14a and 14b, respectively, of the resistive sheet may cover all or a portion of those surfaces of associated electrodes 12a and 12b perpendicular and/or parallel to substrate surface 11a. The thickness T of the resistive material of sheet 14 is predeterminedly selected to provide a predetermined electrical resistance between the highly conductive contacts 12a and 12b, whereby electrical energy coupled to the electrodes from a source 16 (which may be A.C. or D.C.) is dissipated in the resistive material of the sheet. The heat energy will radiate in the direction away from substrate surface 11a and will also, if the substrate is formed of a thermally conductive and electrically insulative material, be conducted through the thickness of substrate 11 and be radiated from an opposite surface 11b thereof.

The amount of heat per unit area of sheet 14 is dependent upon the power dissipated within the resistive sheet. Thus, by varying the potential applied by source 16 between electrodes 12a and 12b or by varying the total resistance between the electrodes (and therefore the current flowing through the resistive sheet) control of the amount of electrical energy input to, and converted by, the resistive layer may be controlled. The total resistance between electrodes 12a and 12b is a function of the resistivity of the sheet material, the sheet average thickness T, the sheet distance D between electrodes and the length L of the sheet. The sheet resistivity of various resistive and semiconductive materials, useful for sheet 14, for various thicknesses T, is known or relatively easy obtainable by known measurement techniques, whereby the heating power of a particular source can be established by selection of the substrate surface area. This one may be easily calculated (and is substantially equal to the product of electrode spacing distance D times the sheet length L, if the electrodes are parallel). Fabrication, as by deposition of a thick film of material, of resistive sheet 14 may result in variations of thickness of the sheet, with respect to distance from one or the other of electrodes 12a and 12b. For relatively thick layers 14, the relative variation is small and substantially equal amounts of electrical power are dissipated per unit length of the distance D between the electrodes, whereby substantially constant heat energy is radiated away from the free surface 14c of the sheet, or is conducted through a heat-conductive substrate to be radiated away from the area of the opposite surface 11b thereof. Use of somewhat lesser sheet thicknesses may produce relatively greater percentage deviations in thickness with respect to distance between the electrodes, necessitating changes in resistivity of the sheet material at intervals during the deposition, or fabrication of the sheet in segments, with each segment having a different resistivity, to produce a sheet having a substantially uniformly distributed resistance between the electrodes.

FIG. 1b illustrates another presently preferred embodiment 10' of a monolithic integrated heat source. Upon the surface 11a of substrate 11, is fabricated a sheet 14' of resistive material, having a thickness T', length L' and width W. As sheet 14' is deposited directly upon the substrate surface 11a a uniformally resistive material may be readily fabricatd into a sheet of essentially constant thickness T'. A pair of electrodes 12a' and 12b' are fabricated of conductive material and positioned in spaced-apart fashion adjacent to opposed edges of the sheet and in electrical contact therewith. Advantageously, the resistance material of sheet 14' may be graphite, which is especially attractive in that it is a low-cost material having high temperature stability. Electrodes 12a' and 12b' may be a braid, or other configuration, formed of copper and the like materials, with a cross-sectional area selected to be consistent with the current selected to flow thorough the resistive sheet, and may be coated or clad with other conductive material, consistent with the temperature and other environmental conditions in which the heat source is to be used. Advantageously, lead wires 18a and 18b, connecting electrodes 12a' and 12b', respectively, to a source of electrical operating potential, may be attached to the electrodes by any suitable means, such as with conductive epoxy, by soldering with high-melting-temperature solder, by welding, mechanical fasteners, and the like. It should be understood that the active resistance area of sheet 14' is determined substantially by the conductor spacing distance D' and by the actual length of the conductors in contact with sheet 14' (illustrated as having the same length L' as the substrate, in FIG. 1b).

Referring now to FIGS. 1c and 1d, the buried-electrode embodiment of FIG. 1a, and the external-electrode embodiment of FIG. 1b, may respectively be fabricated upon a member 20 having a core 22 of a material which is both highly-electrically-conductive and highly-thermally-conductive, which core 22 is essentially encapsulated by a sheathing of insulative material 24. For mechanical strength, core 22 may be fabricated of steel and the like materials, with insulative sheathing 24 being fabricated of enamel or porcelain. This substrate is highly desirable, as enamel- or porcelain-covered steel panels are widely used in appliance manufacture and would allow the other advantages of coated steel to be utilized in addition to maintaining relatively low cost and process control of the heat sources.

In FIG. 1c, monolithic integrated heat source 10'', having conductors 12a and 12b fabricated upon the exterior surface 24a of the insulative sheathing 24 surrounding conductive core 22, is overlaid with resistance material sheet 14. Lead wires 18a and 18b are connected to respective electrodes 12a and 12b. In FIG. 1d, the conductors 12a' and 12b' are fabricated on the external surface 14c' of sheet 14', itself fabricated directly on the exterior surface 24a' of the insulative sheath 24' of the heat source. In FIG. 1c, a layer of insulation 30 is shown, which may be any available thermal insulative material, preferably having electrical insulative properties, and they have a highly heat-reflective surface 30a closest to the heat source. Insulation 30 may be utilized with any of monolithic integrated heat sources 10–10''', of FIGS. 1a–1d, respectively. It should be understood that thermal insulation 30 may be positioned at, or adjacent to, sheet resistance surface 14c, to direct thermal energy back toward source 10'' for conduction into the space beyond the opposite side of the heat source from the side upon which the sheet resistance is fabricated. It should be understood that, as previously mentioned hereinabove, the resistive material utilized to fabricate sheet 14 may be any resistive or semiconductive material, having the desired sheet resistivity and other electrical and mechanical parameters.

Referring now to FIG. 2, a heating apparatus 40, such as an oven and the like, is provided by fabricating a shell 42 having sides formed of electrically-insulating but thermally conductive material (which may have a conductive core, as illustrated in FIGS. 1*c* and 1*d*). Thus, the walls of the oven cavity are formed by: the interior surface 44*a* of a top substrate 44; the interior surface 46*a* of a bottom substrate 46; the interior surfaces 48*a* and 50*a* of sidewall substrates 48 and 50, respectfully; the interior surface 52*a* of a rear substrate 52 and the interior surface of a front substrate (not shown in this sectional view). Advantageously, heating apparatus 40 may be built with more or less than six abutting surfaces, but with all surfaces advantageously integrally joined to adjacent surfaces to completely enclose a volume to be heated. It should be understood that suitable means may be utilized to allow movement of one or more surfaces to facilitate access to the cavity to permit items to be heated, such as food and like, to be placed in, and removed from, the heating apparatus cavity.

Each substrate 44, 46, 48, 50, 52 and the front substrate, have at least one monolithic integrated heat source 55 fabricated upon the respective exterior surfaces 44*b*, 46*b*, 48*b*, 50*b*, etc. thereof. Thus, monolithic integrated heat sources 10*a*'-10*e*' (and the sixth heat source on the front panel, which is not shown) are illustratively of the type shown in FIG. 1*b*, having a resistive sheet 14' of substantially constant thickness fabricated upon the exterior surface of an electrically-insulative and thermally-conductive substrate. Advantageously, each sheet 14' has a greater dimension than the associated dimension of the cavity formed upon the opposite surface of the substrate, as illustrated by elements 10*a*' and 10*b*' (it being understood that elements 10*c*', 10*d*', etc., may also meet this criteria, even though not illustrated as such). Thus, each unit area of the entire interior surfaces of each wall is receiving a substantially uniform amount of heat energy and radiating a substantially uniform amount of heat energy into the cavity. As the heating apparatus has a number of heating elements, e.g., six redundant heating elements in the illustrated apparatus, the heating apparatus will still be usable, with only a relatively small reduction in performance, in the event of failure of one heat source.

If apparatus 40 is a food-cooking oven, a self-clean function is easily provided, wherein the interior heating apparatus walls 44*a*, 46*a*, 48*a*, 50*a*, 52*a*, etc., may be raised to a temperature in excess of 800° F., which temperature is sufficient for self-cleaning to occur, while the air within the oven cavity itself is slowly heated to much lower, and therefore safer, temperature levels.

Illustratively, the temperature-versus-time relationships of the oven cavity temperature $T_O$ and the oven wall temperature $T_W$, are shown in FIG. 2*a* for an oven set for a temperature of 300° F., but having a "pulse" wall heating feature for self-cleaning purposes. In FIG. 2*a*, temperature, in degrees Fahrenheit (° F.), is plotted along ordinate 45, while time, in minutes, after initial energization of the monolithic integrated heat sources of the oven, is plotted along abscissa 47. Commencing at the turn-on time (zero minutes), a relatively great amount (a "pulse") of heat energy is applied to the interior wall surfaces, as by connecting all of the heat source elements in electrical parallel connection across the energizing potential source, as illustrated in FIG. 2. The wall temperature $T_W$ rises rapidly, as at portion 48*a* of the wall temperature $T_W$ curve. After some initial period of time, e.g. the first ten minutes of operations as illustrated, the wall temperature has reached a maximum, established by the amount of electrical energy converted to heat energy by the heat sources. In the illustrated embodiment, the resistive power dissipation is coordinated with the wall area to provide a maximum wall temperature of about 800° F., as at portion 48*b* of the wall temperature $T_W$ curve. This temperature is maintained for a predetermined time interval, e.g. about ten minutes in the illustrated case, which time interval at the self-clean temperature of the walls is sufficient to clean deleterious matter therefrom. As previously mentioned, when trying to clean off certain "sugars," as might be found in pie fillings or frostings, the sugars will ordinarily oxidize to form an ash upon the surface of the deposits, which ash acts as an insulator to keep heat energy in the oven cavity from reaching the remaining sugars underneath the ash and adjacent to the cavity walls. Thus, excess cleaning times and temperatures are required to clean off "sugar" contaminants. However, when the walls are directly heated, as in heating apparatus 40 of FIG. 2, an ash forming on the surface of a sugar deposit does not prevent the energy from being delivered to the additional sugars between the ash and the wall, as the heat is coming from the wall side of the contaminant deposit. Therefore, relatively short self-clean times are possible. After the relatively-short self-clean time (during which the relatively high thermal inertia of the air inside the oven cavity is only slowly overcome, i.e. the oven cavity temperature slowly rises) the amount of electrical energy provided to the heat sources may be reduced, as by switching from a parallel-connected configuration to a series-connected, or series-parallel-connected, configuration, reducing the amount of heat energy applied to the heating apparatus cavity walls, as at portion 48*c* of the wall temperature $T_W$ occur, whereby the wall temperature decreases. It should be understood that the self-clean "pulse" of energy can be applied to all walls, or to individual walls on a cyclic basis, of the heated cavity each time a specific oven function is called for, such as during the bake cycle of an oven, or only when the oven is set for bake and also for a temperature in excess of 300° F., and the like.

This is especially advantageous in that the interior of the heating apparatus cavity follows a somewhat exponential heating curve 49, and asymptotically approaches the final oven temperature, e.g. 300° F. Thus, the cavity temperature itself is not raised to an excessive level and external appliance surface temperatures will also be below a hazardous level. There is then no need to provide expensive heat shields, door locks or interlock devices. It is also an advantage in that the applicance can more easily meet safety standards requiring that the external appliance surfaces do not reach temperatures which exceed certain values, thereby reducing personnel burn and fire hazards. Because the cavity temperature is at a lower level during a self-clean cycle, the appliance insulation requirements, which are normally established by that amount of insulation required to meet the relatively higher external surface temperatures during the self-clean mode of operation, can be reduced.

While several preferred embodiments of the present invention have been described in detail herein, many modifications and variations will now become apparent to those skilled in the art. For example, other thick film sheet resistance materials, such as provided by the materials available in the Power Ohm 600 Series from Thick Film Systems, Santa Barbara, Ca. and in the 2000-1 (Porcelain Profile) and 5000 (Alumina Profile) Series from Electro Materials Corp. America, Mamaroneck, N.Y., may be utilized. Further, an oven having a plurality of our novel monolithic heat sources integrated into a plurality of the oven walls, may be controlled to have a temperature gradient within the oven, whereby by providing different amounts of electrical energy to the various heat sources, different portions of the oven cavity receive different amounts of heat energy and are therefore at different temperatures. It is our intent, therefore, to be limited only by the scope of the pending claims and not by the specific details presented by way of description herein.

What is claimed is:

1. An oven having an oven cavity heated by conversion of electrical energy into heat energy, comprising:

a substrate fabricated of an electrically insulative and thermally conductive material and with a geometric shape enclosing said oven cavity to be heated, said substrate having a first surface forming the exterior surface of said cavity and a second surface forming an interior surface of said cavity and from which heat energy enters said cavity after conduction through said substrate;

a plurality of spaced-apart electrically conductive members positioned adjacent to said substrate first surface;

a sheet of material directly secured between, and in electrical contact with, said plurality of conductive members and secured to at least a portion of said substrate first surface;

at least one additional plurality of spaced-apart electrically conductive members positioned adjacent to said substrate first surface at a location remote from said plurality of conductive members;

at least one additional sheet of material, each secured to other portions of said substrate first surface different from the portion of said substrate first surface to which said sheet of material is secured, each of said at least one additional sheet directly secured and electrically connected between at least an associated pair of the at least one additional plurality of conductive members;

the material of said sheet and said at least one additional sheet having a predetermined electrical resistance measurable between different ones of said conductive and additional conductive members;

the resistance of said material of said sheet and of said at least one additional sheet of material causing conversion of electrical energy, coupled into said sheet and said at least one additional sheet via associated ones of the total number of said conductive members, into heat energy for energy transfer through said substrate and from said substrate second surface into said cavity; and means for connecting a source of electrical energy to predetermined ones of the total number of conductive members to cause electrical energy to be converted to heat energy in associated predetermined ones of the sheet and the at least one additional sheet fabricated upon said substrate first surface.

2. The oven as set forth in claim 1, wherein the material of said sheet is deposited as a thick film.

3. The oven as set forth in claim 1, wherein said material is graphite.

4. The oven as set forth in claim 1, wherein said material is electrically semiconductive.

5. The oven as set forth in claim 1, wherein said plurality of conductive members are secure to said substrate first surface.

6. The oven as set forth in claim 5, wherein at least one of said sheet and said at least one additional sheet of material is secured to said substrate first surface between associated ones of the total number of said spaced-apart conductive members.

7. The oven as set forth in claim 6, wherein said at least one of said sheet and said at least one additional sheet of material also at least partially encloses at least one of said total number of conductors.

8. The oven is set forth in claim 1, wherein at least one of said sheet and said at least one additional sheet of material has opposed first and second surfaces, with at least a portion of said first surface of said at least one of said sheet and said at least one additional sheet substantially secured to said substrate first surface; at least one of the total number of conductive members being secured to said second surface of said at least one of said sheet and said at least one additional sheet.

9. The oven as set forth in claim 8, wherein all of said total number of conductive members are substantially secured to said second surface of the associated one of said sheet and said at least one additional sheet.

10. The oven as set forth in claim 1, further comprising means positioned beyond said substrate first surface for reflecting thermal energy flowing away from said substrate first surface back to said substrate for conduction therethrough to said substrate second surface.

11. The oven as set forth in claim 1, further comprising a core member of an electrically and thermally conductive material substantially in abutment with said substrate second surface.

12. The oven as set forth in claim 11, wherein said core member is fabricated of steel.

13. The oven as set forth in claim 11, wherein said substrate forms a sheath substantially enclosing said core member.

14. The oven as set forth in claim 13, wherein said sheathing substrate material is a ceramic material.

15. The oven as set forth in claim 14, wherein said sheating material is porcelain.

16. The oven as set forth in claim 13, wherein said sheathing material is an enamel.

17. The oven as set forth in claim 1, wherein said substrate material is a ceramic material.

18. The oven as set forth in claim 17, wherein said substrate material is porcelain.

19. The oven as set forth in claim 1, wherein at least one of said sheet and said at least one additional sheet receives an amount of electrical energy sufficient to raise the temperature of the associated substrate second surface, forming the interior surface of said cavity, initially to a temperature exceeding a desired temperature within the cavity and then to reduce the temperature of said cavity-interior-surface-forming substrate second surface to the desired cavity temperature as the desired cavity temperature is approached in a portion of said cavity located away from said substrate second surface.

20. The oven as set forth in claim 19, wherein the initial amount of electrical energy supplied to at least one of said sheet and said at least one additional sheet is preselected to cause any contaminants coated upon the associated cavity-interior-surface-forming substrate second surface to be burned off.

21. The oven as set forth in claim 20, wherein the associated substrate second surface is heated to a temperature of at least 800° F.

22. The oven as set forth in claim 20, wherein the associated substrates second surface is heated to a temperature of at least 800° F. for at least 10 minutes.

23. The oven as set forth in claim 19, wherein at least one of the sheet and the at least one additional sheet produces an amount of heat energy different from the amount of heat energy produced by at least one other one of the sheet and the at least one additional sheet.

24. The oven as set forth in claim 23, wherein the different amount of heat energies is produced by said sheet and said at least one additional sheet are predeterminately selected to provide a temperature gradient across the cavity.

* * * * *